United States Patent
Singh et al.

(10) Patent No.: US 7,936,682 B2
(45) Date of Patent: May 3, 2011

(54) DETECTING MALICIOUS ATTACKS USING NETWORK BEHAVIOR AND HEADER ANALYSIS

(75) Inventors: Sumeet Singh, Fremont, CA (US); George Varghese, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1045 days.

(21) Appl. No.: 11/271,133

(22) Filed: Nov. 9, 2005

(65) Prior Publication Data
US 2006/0098585 A1  May 11, 2006

Related U.S. Application Data

(60) Provisional application No. 60/522,810, filed on Nov. 9, 2004.

(51) Int. Cl.
*H04L 12/26* (2006.01)
(52) U.S. Cl. .......................... 370/241; 726/24
(58) Field of Classification Search .................. 370/241, 370/389; 726/22, 23, 24
See application file for complete search history.

(56) References Cited

U.S. PATENT DOCUMENTS

| | | | |
|---|---|---|---|
| 4,734,856 A | 3/1988 | Davis | |
| 6,016,546 A | 1/2000 | Kephart et al. | |
| 6,279,113 B1 | 8/2001 | Vaidya | |
| 6,477,651 B1 | 11/2002 | Teal | |
| 6,519,703 B1 | 2/2003 | Joyce | |
| 6,578,147 B1 | 6/2003 | Shanklin et al. | |
| 6,738,814 B1 | 5/2004 | Cox et al. | |
| 6,829,635 B1 | 12/2004 | Townshend | |
| 6,988,208 B2 | 1/2006 | Hrabik et al. | |
| 7,080,408 B1 | 7/2006 | Pak et al. | |
| 7,089,592 B2 | 9/2006 | Adjaoute | |
| 7,130,981 B1 | 10/2006 | Nachenberg | |
| 7,251,692 B1 * | 7/2007 | Raz | 709/225 |
| 7,451,309 B2 | 11/2008 | Aaron et al. | |

(Continued)

FOREIGN PATENT DOCUMENTS
WO    WO-2005103899 A1    11/2005

OTHER PUBLICATIONS

"U.S. Appl. No. 10/822,226, Final Office Action mailed May 23, 2008", 21 pgs.

(Continued)

*Primary Examiner* — Min Jung
(74) *Attorney, Agent, or Firm* — Schwegman, Lundberg & Woessner, P.A.

(57) ABSTRACT

A method and apparatus for detecting malicious attacks is described. The method may comprise obtaining routing information from a packet communicated via a network and maintaining a count of packets associated with a device associated with the routing information. For example, the routing information may a source or destination IP address, a port number, or any other routing information. The device may be classified as a potentially malicious device when the count exceeds a threshold. The count may be incremented when the TCP SYN flag is set and the TCP ACK flag is not set. An embodiment comprises obtaining a source hash of the source IP address and a destination hash of the destination IP address. Thereafter, the source hash and the destination hash may be mapped to multi stage filters. The device associated with the packet may then be selectively categorizing as a suspicious device.

22 Claims, 7 Drawing Sheets

U.S. PATENT DOCUMENTS

| | | | |
|---|---|---|---|
| 7,535,909 | B2 | 5/2009 | Singh et al. |
| 2002/0107953 | A1 | 8/2002 | Ontiveros et al. |
| 2002/0129140 | A1 | 9/2002 | Peled et al. |
| 2003/0004689 | A1 | 1/2003 | Gupta et al. |
| 2003/0067921 | A1* | 4/2003 | Sivalingham ............... 370/394 |
| 2003/0105973 | A1 | 6/2003 | Liang et al. |
| 2003/0115485 | A1 | 6/2003 | Milliken |
| 2003/0145232 | A1* | 7/2003 | Poletto et al. ............... 713/201 |
| 2003/0226035 | A1* | 12/2003 | Robert et al. ............... 713/201 |
| 2004/0054925 | A1* | 3/2004 | Etheridge et al. ............ 713/201 |
| 2004/0064737 | A1 | 4/2004 | Milliken et al. |
| 2004/0073617 | A1 | 4/2004 | Milliken et al. |
| 2004/0117648 | A1 | 6/2004 | Kissel |
| 2004/0215976 | A1* | 10/2004 | Jain ............................. 713/201 |
| 2004/0257994 | A1 | 12/2004 | Paskett et al. |
| 2005/0041955 | A1 | 2/2005 | Beuque |
| 2005/0060535 | A1 | 3/2005 | Bartas |
| 2005/0060754 | A1 | 3/2005 | Simyon |
| 2005/0076228 | A1 | 4/2005 | Davis et al. |
| 2005/0111367 | A1* | 5/2005 | Chao et al. ................... 370/235 |
| 2005/0114700 | A1 | 5/2005 | Barrie et al. |
| 2005/0229254 | A1 | 10/2005 | Singh et al. |
| 2005/0262556 | A1* | 11/2005 | Waisman et al. ............... 726/22 |
| 2005/0262561 | A1 | 11/2005 | Gassoway |
| 2006/0048209 | A1 | 3/2006 | Shelest et al. |
| 2006/0064746 | A1 | 3/2006 | Aaron et al. |
| 2006/0072464 | A1 | 4/2006 | Aaron et al. |
| 2006/0098687 | A1 | 5/2006 | Singh et al. |
| 2006/0107318 | A1* | 5/2006 | Jeffries et al. ................. 726/22 |
| 2006/0117126 | A1 | 6/2006 | Leung et al. |
| 2006/0139187 | A1 | 6/2006 | Helfman et al. |
| 2006/0150249 | A1* | 7/2006 | Gassen et al. .................. 726/23 |
| 2006/0161986 | A1 | 7/2006 | Singh et al. |
| 2006/0242703 | A1 | 10/2006 | Abeni |
| 2007/0025243 | A1 | 2/2007 | Ayyagari et al. |
| 2007/0047457 | A1 | 3/2007 | Harijono et al. |
| 2007/0094728 | A1 | 4/2007 | Julisch et al. |
| 2007/0112714 | A1 | 5/2007 | Fairweather |
| 2007/0192863 | A1 | 8/2007 | Kapoor et al. |
| 2008/0140631 | A1 | 6/2008 | Pandya |
| 2008/0140912 | A1 | 6/2008 | Pandya |
| 2008/0140991 | A1 | 6/2008 | Pandya |
| 2008/0219178 | A1 | 9/2008 | Barrett |

OTHER PUBLICATIONS

"U.S. Appl. No. 10/822,226, Final Office Action mailed Aug. 12, 2009", 29 pgs.

"U.S. Appl. No. 10/822,226, Non Final Office Action mailed Feb. 4, 2009", 26 pgs.

"U.S. Appl. No. 10/822,226, Non Final Office Action mailed Aug. 11, 2008", 20 pgs.

"U.S. Appl. No. 10/822,226, Non Final Office Action mailed Oct. 4, 2007", 20 pgs.

"U.S. Appl. No. 10/822,226, Non Final Office Action mailed Oct. 22, 2009", 6 pgs.

"U.S. Appl. No. 10/822,226, Response filed Jan. 28, 2008 to Non Final Office Action mailed Oct. 4, 2007", 24 pgs.

"U.S. Appl. No. 10/822,226, Response filed Apr. 9, 2009 to Non Final Office Action mailed Feb. 4, 2009", 33 pgs.

"U.S. Appl. No. 10/822,226, Response filed Jul. 15, 2008 to Final Office Action mailed May 23, 2008", 30 pgs.

"U.S. Appl. No. 10/822,226, Response filed Oct. 9, 2009 to Final Office Action mailed Aug. 12, 2009", 38 pgs.

"U.S. Appl. No. 10/822,226, Response filed Nov. 10, 2008 to Non Final Office Action mailed Aug. 11, 2008", 29 pgs.

"Data Reduction", *Microsoft Computer Dictionary, 5th Edition*, (2002), p. 144.

"Data Reduction", *Chambers Dictionary of Science and Technology,*, (1999), p. 303.

"Data Reduction", *McGraw-Hill Dictionary of Scientific and Technichal Terms 6th Edition.*, (2003), p. 505.

"International Application Serial No. PCT/US2004/040149, International Preliminary Report on Patentability mailed Oct. 11, 2006", 11 pgs.

"International Application Serial No. PCT/US2004/040149, International Search Report and Written Opinion mailed Apr. 11, 2005", 10 pgs.

"Snort Web Site", [Online]. Retrieved from the Internet: <URL: http://www.snort.org/>, (May 23, 2009), 1 pg.

Bloom, Burton, "Space/Time Trade-offs in Hash Coding with Allowable Errors", Communications of the ACM vol. 23 No. 7, (Jul. 1970), 422-426.

Estan, Christian, et al., "Building a Better NewFlow", *SIGCOMM 2004 Tech Report*, (Aug. 2004), 12 pgs.

Fan, Li, et al., "Summary Cache: A Acalable Wide-Area Web Cache Sharing Protocol", *ACM SIGCOMM*, (Sep. 1998), 12 pgs.

Graham, Paul, "A Plan for Spam", [Online]. Retrieved from the Internet: <URL: http://www.paulgraham.com/spam.html>, (Aug. 2002), 13 pgs.

Manber, Udi, "Finding Similar Files in a Large File System", *USENIX Technical Conference*, (Jan. 1994), 11 pgs.

Moore, David, et al., "Inferring Internet Denial-of-Service Activity", *Proceedings of the 10th USENIX Security Symposium*, (Aug. 2001), 14 pgs.

Moore, David, et al., "Internet Quarantine: Requirements for Containing Self-Propagating Code", *22nd Annual Joint Conference of the IEEE Computer and Communications Societies*, (Apr. 2003), 10 pgs.

Rabin, Michael O, "Fingerprinting by Random Polynomials", *Center for Research in Computing Technology, Harvard University Report TR-15-91*, (1981), 14 pgs.

Singh, Sumeet, et al., "Automated Worm Fingerprinting", *6th Symposium on Operating Systems Design and Implementation. USENIX Association*, (Dec. 2004), 45-60.

U.S. Appl. No. 10/822,226, Examiner Interview Summary mailed Nov. 18, 2010, 3 pgs.

U.S. Appl. No. 10/822,226, Office Action response filed Nov. 15, 2010, 10 pgs.

U.S. Appl. No. 10/822,226, Non-Final Office Action mailed May 13, 2010, 12 pgs.

\* cited by examiner

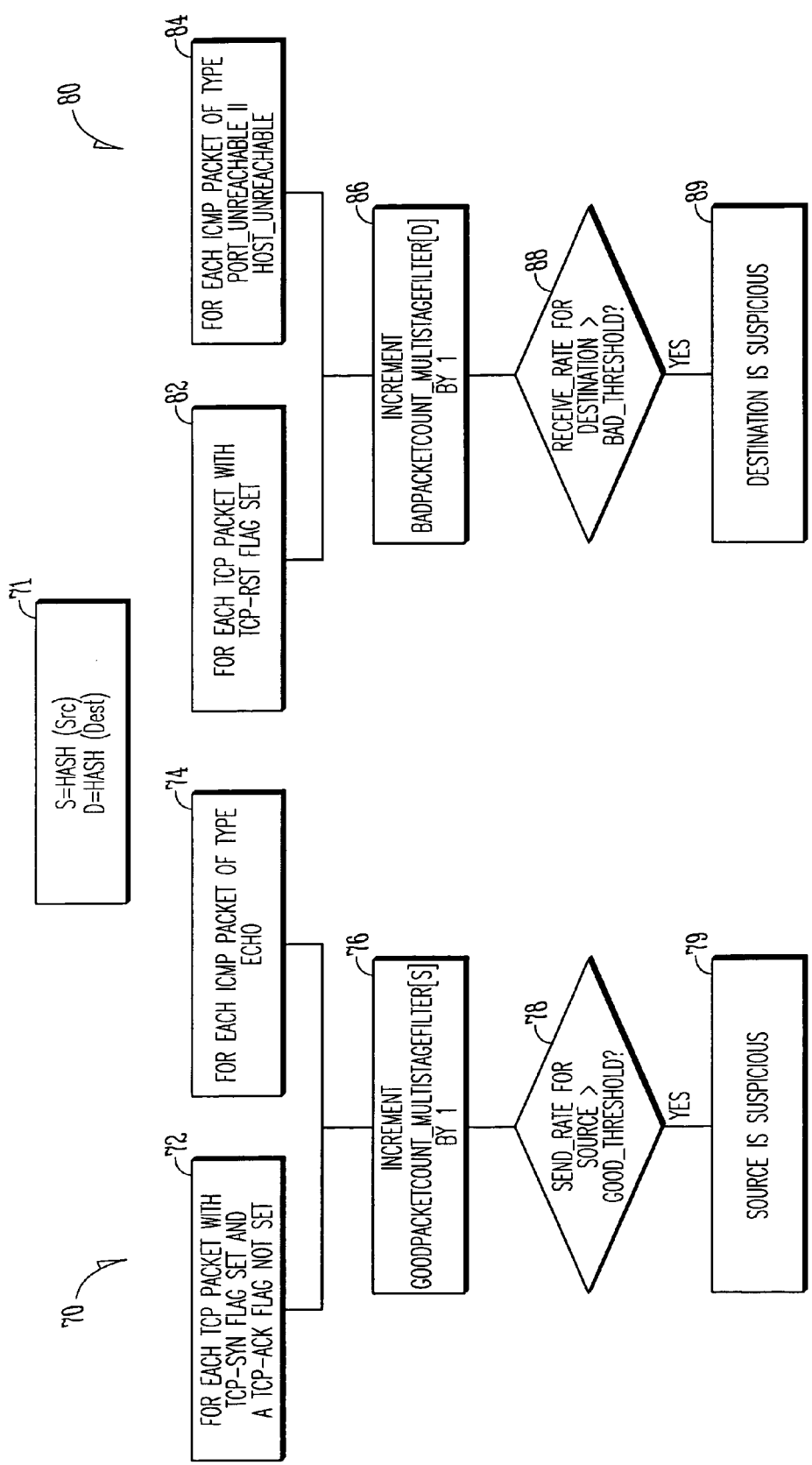

DETECTING MALICIOUS ATTACKS USING NETWORK BEHAVIOR AND HEADER ANALYSIS

CLAIM OF PRIORITY

This patent application claims the benefit of priority, under 35 U.S.C. Section 119(e), to U.S. Provisional Patent Application Ser. No. 60/522,810, filed on Nov. 9, 2004, the entire content of which is incorporated herein by reference.

TECHNICAL FIELD

This application relates to a method and apparatus to detect malicious attacks using content and header analysis. For example, the method and apparatus may detect malicious attacks at any node within a network.

BACKGROUND

A packet or datagram is a piece of a message transmitted over a packet-switching network. An example of a packet-switching network is the Internet where enormous quantities of data are communicated between various network points. In the Internet environment, content to be communicated between two endpoints is broken up into packets and these packets may follow different paths whilst travelling between the endpoints. It will be appreciated that the contents of packets may be benign or malicious.

An example of malicious content in a packet is data associated with viruses, computer worms, or the like and any malicious attack may thus include such malicious content.

BRIEF DESCRIPTION OF DRAWINGS

The present invention is illustrated by way of example and not limitation in the figures of the accompanying drawings, in which like references indicate similar elements and in which:

FIG. 5 shows a method, in accordance with an example embodiment, to identify a suspicious source device that may be sending malicious packets.

FIG. 6 shows a method, in accordance with an example embodiment, to identify a suspicious destination device that may be attempting to send malicious packets.

DETAILED DESCRIPTION

Figure 1:
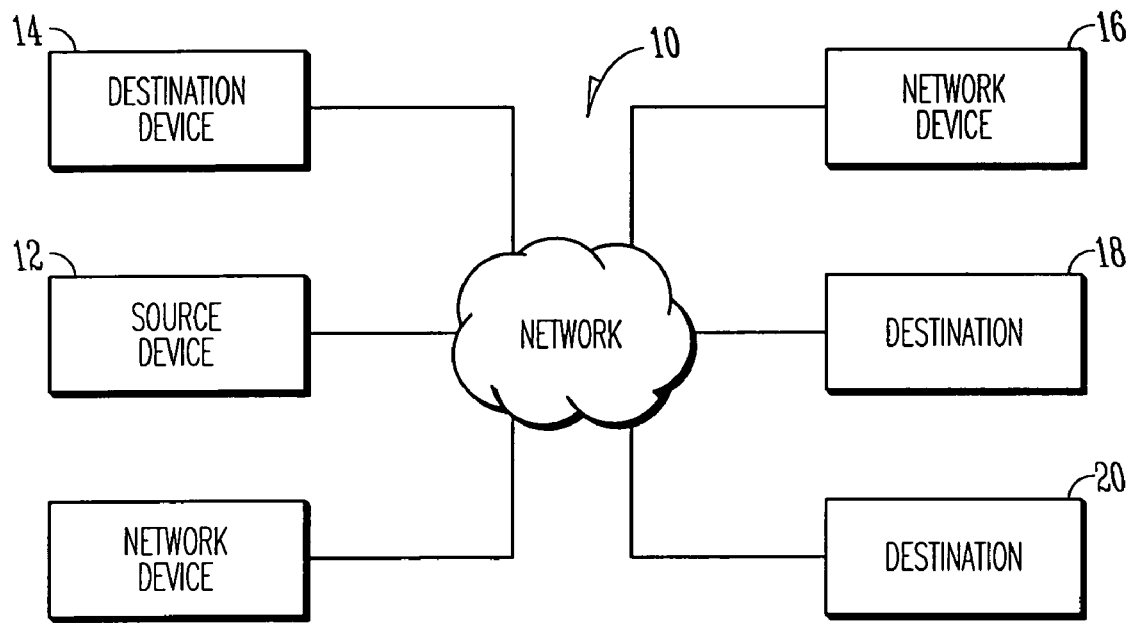
FIG. 1 shows an example network in which packets are communicated between a plurality of network devices.

In the following description, for purposes of explanation, numerous specific details are set forth in order to provide a thorough understanding of embodiments of the present invention. It will be evident, however, to one skilled in the art that the present invention may be practiced without these specific details.

Example embodiments are described herein of methods that may be used to detect malicious attacks (e.g., fast spreading worms via a network). In example embodiments, new and unknown worms and other large scale attacks may be detected without any manual intervention. For example, embodiments of the invention may be deployed to counter Fragmentation attacks, Polymorphic Worm attacks, Encrypted Worm attacks, or the like. A Fragmentation attack may occur when an attack exhibits itself by a sufficiently large piece of content (e.g., 40 bytes or larger) being broken up into smaller pieces that are provided in subsequent packets. Thus, the malicious content is divided up into several packets and not contained in a single packets thereby making detection more difficult. It is however to be appreciate that the initiator of the attack could break up the attack into smaller packets each containing a low number of bytes (e.g., 1 byte of the attack may be provided in each packet). Polymorphic Worms are worms that change periodically (e.g., with some limit on every infection) so that only very few portions of the packet repeat themselves in subsequent packets. Encrypted Worms encrypt malicious code using a secret key that is different for each destination to which the malicious payload is sent. It will be appreciated that these techniques are used by persons of devious intent to disguise the true nature of the content to facilitate spreading of an attack.

In an example embodiment, a method and apparatus is described to process or test packet headers of network traffic that can be indicative of an attack in progress. As analysis of headers of the packets is performed (as packet payload or packet content), it will be appreciated that such processing or testing may not be evaded by fragmentation, polymorphism or encryption techniques because the analysis does not depend on content.

In an example embodiment, a basic scalable processing method or test is described that may identify suspicious sources that send or receive too many packets and may thus be indicative of an attack in progress. In another example embodiment, a more sophisticated analysis or test is described to detect that a set of suspicious sources is actively spreading malicious content using basic mechanisms. In a further example embodiment, a method and apparatus is described that is relatively resilient to evasion attacks. A method and apparatus is also described that may be used to reduce false positives and to defend against other algorithmic assumptions.

Although embodiments are described, by way of example, with reference to detecting the presence of worms in packets, it will be appreciated by a person of skill in the art that the methods and apparatus described herein may apply to any other attacks. Thus, it is important to appreciate that the embodiments described herein are not limited to detecting any specific type of malicious attack but apply to any malicious attack originating from a suspicious source. Thus, other types of malicious activities that are prevalent on the Internet that can be detected using the methodologies described herein. For example, the methodologies described herein may be used to identify hosts infected by Trojans/bots or hosts being used as SPAM relays, or hosts that are being used as stepping-stones to mount attack on other hosts.

Basic Detection of Suspicious Sources

During normal network usage most sources typically initiate connections to very few other devices or nodes. If, for example, the source device is a client, the client device often talks to a few servers such as a mail server or a web server and, in these example circumstances, the servers themselves should never initiate connections. When a malicious attack (e.g., a worm or virus outbreak) occurs, infected source devices typically try and infect other computers. This may result in two side effects. When a source gets infected, the first side effect is that the source typically tries to initiate connections to many other destinations in order to propagate the attack. For example, the source may send TCP SYN packets (Transmission Control Protocol Synchronization Packets) or first use ICMP (Internet Control Message Protocol) messages to test if the destination is responding.

When a normal TCP connection starts, a destination device receives a SYN (synchronize/start) packet from a source device and sends back a SYN ACK (synchronize acknowledge). The destination device must then hear an ACK (acknowledge) of the SYN ACK before the connection is established. This is referred to as the "TCP three-way handshake." While waiting for the ACK to the SYN ACK, a connection queue of finite size on the destination host keeps track of connections waiting to be completed. This queue typically empties quickly since the ACK is expected to arrive a few milliseconds after the SYN ACK. A TCP SYN attack exploits this design by having an attacking source host generate TCP SYN packets with random source addresses toward a victim host. The victim destination host sends a SYN ACK back to the random source address and adds an entry to the connection queue. Since the SYN ACK is destined for an incorrect or non-existent host, the last part of the "three-way handshake" is never completed and the entry remains in the connection queue until a timer expires, typically for about one minute. By generating phony TCP SYN packets at a rapid rate (and not completing the three-way handshake), it is possible to fill up the connection queue and deny TCP services (such as e-mail, file transfer, or WWW) to legitimate users.

The second side effect is that most infected sources try to find destinations to infect by randomly scanning of the IP address space. This is analogous to picking a random telephone number and trying to call the number; in many cases there will be no response. When this is done with Internet addresses (IP addresses), and an attempt is made to send a packet to a non-functional address, the network responds (much as a post office responds with a non-delivery message when mailing a physical package or letter) with a non-delivery message. If the message or packet could not be routed to the destination, routers send back a so-called ICMP unreachable message to the source. If the message can be routed but is going to an unavailable service, then the receiving host responds with a TCP reset or an ICMP port unreachable message. Both these responses are very common with random scanning malicious attacks (e.g., random scanning worms) because many IP addresses are not used, and not every service is deployed on every computer. Thus, the above-mentioned side effects result in an unusually high number of packets sent from an infected source device.

An anomalous source may thus be defined as a source that has an excessive amount network activity (e.g., good packets sent or bad packets received). For example, good packets sent may be TCP packets with a SYN flag set but no ACK flag set, or ICMP echo packets (or even if the corresponding MAC address sends too many ARP packets) that may be indicative of unusual activity. It will however be appreciated that the aforementioned example packets are used merely by way of example and that the embodiments described herein are not limited to sending SYC and ACK flag conditions. Bad packets received are packets that may include ICMP unreachable status or TCP Resets that may be indicative of an unusual number of failures which may be evidence of scanning of multiple destinations by the source device. It is to be appreciated that the aforementioned categories are used merely by way of example and another example of a bad category could be a source device that sends to an IP address for which a DNS translation was not received (many worms that do random scanning bypass the DNS).

In an example embodiment, keeping track of sources exhibiting the aforementioned behavior may be done by using a hash table of sources with a separate counter (which may be cleared periodically) for each category of packets. In an embodiment, a more scaleable approach may combine good and bad packet counters into counter sets such that a counter is incremented if a packet belongs to any of the categories in the set. For example, a simple strategy in an embodiment is to keep one counter for all good packets sent by each source device, and another counter for all bad packets sent by each source device.

Figure 2:
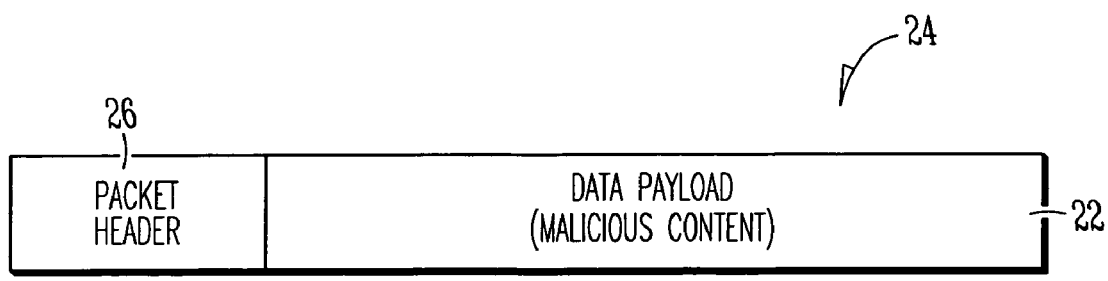
FIG. 2 shows an example packet used to communicate content in a network.

FIG. 1 shows an example network 10 interconnecting a plurality of network devices (e.g., routers, switches, client devices, servers, and so on). It will be appreciated that, by way of example, a source device 12 may spread malicious content 22 in a data payload of a packet 24 (see FIG. 2). A packet header 26 of the packet 24 may include a destination IP address and, following the example above, may send packets to destination network devices 14-20. Thus, the number of good and bad packets associated with the source device 12 will be unusually high when a malicious attacked is emanating from the source device 12. As described in detail below, apparatus 30 (see FIG. 3) in accordance with an example embodiment may detect a network attack by analyzing headers of packets in the network 10. FIG. 4 shows a detection engine 50, in accordance with an example embodiment, to detect a malicious attack in a network.

FIG. 5 shows a method 70, in accordance with an example embodiment, to identify a suspicious host (identified by the source IP address) that may be sending malicious packets. FIG. 6 shows a method 80, in accordance with an example embodiment, to identify a suspicious host (identified by the destination IP address) that may be sending malicious packets and is receiving a packet in response thereto. In an embodiment the methods 70 and 80 use a multistage filter indexed by source IP address (in the method 70) and destination IP address (in the method 80) that screens out the frequent packets (good and bad) and then maintains a hash table on the sources that cross a predefined threshold that defines the bound of acceptable behavior. As the methods 70 and 80 use a multistage filter and hash table they may be highly scaleable. It will be appreciated that, in addition to or instead of header analysis, ports can be tracked and an unusual amount of traffic associated with a particular port can be indicative of a malicious attack. As in the case of header analysis, port tracking can be done scalably by maintaining a table for the most common services and using a multistage filter indexed by port. Thus by monitoring packet traffic from a source location (source device, particular port, or the like) a malicious attack may be detected.

In the method 70, as shown at block 71, a hash of the source IP address may be generated to provide source hash S. Thereafter, as shown at block 72, for each TCP packet with a TCP SYN flag set and a TCP ACK flag not set, a good packet count may be incremented. For example, when using a multistage filter, a good packet count (GoodPacketCount_MultiStage Filter [S]) in the multistage filter may be incremented by 1. Likewise, as shown at block 74, for each ICMP packet of type ECHO, the good packet counter may be incremented. When the send rate of good packets sent from any source device exceeds a set threshold (see block 78—good_threshold), the source device may be categorized as being a suspicious device (see block 79). It will be appreciated that the hash of a port number could also provide an indication of unusual traffic and be processed as described above.

In the method 80, a hash of the destination IP address may be generated to provide destination hash D. Thereafter, as shown at block 82, for each TCP packet with a TCP-RST flag set, a bad packet count may be incremented. For example, when using a multistage filter, a bad packet count (BadPacketCount_MultiStage Filter [D]) in the multistage filter may be incremented by 1 (see block 86). Likewise, as shown at block 84, for each ICMP packet of an associated unreachable port the bad packet count may be incremented. For example, for each ICMP packet of type PORT_UNREACHABLE || HOST_UNREACHABLE the bad packet counter may be incremented. When the receive rate of bad packets received at any destination device exceeds a set threshold (see block 88—bad_threshold), the destination device may be categorized as a suspicious device (see block 89). It will be appreciated that the hash of a port number could also provide an indication of unusual traffic and be processed as described above.

The methods 70, 80 may be viewed as a data-reduction process that can be used to identify the sources or destinations that appear to be suspicious and need to be further analyzed. For example, a further analysis step may be used to identify the specific nature of the attack. For example, if in the first step using the methods 70, 80 it has been identified that the source was sending a large number of TCP SYN packets, then the second step may determine a service port number that the TCP SYN packets were being sent to.

Figure 3:
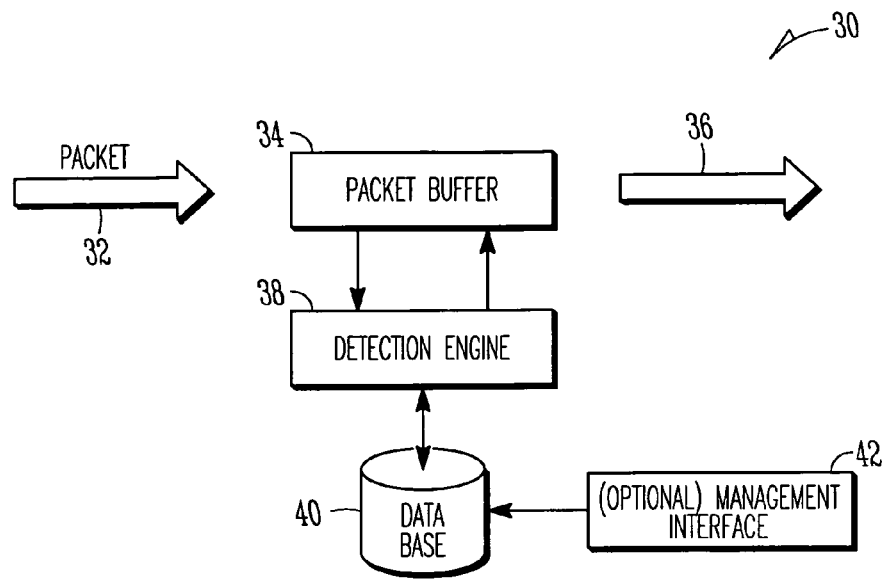
FIG. 3 shows apparatus, in accordance with an example embodiment, to detect a potentially malicious attack in a network.
Figure 4:
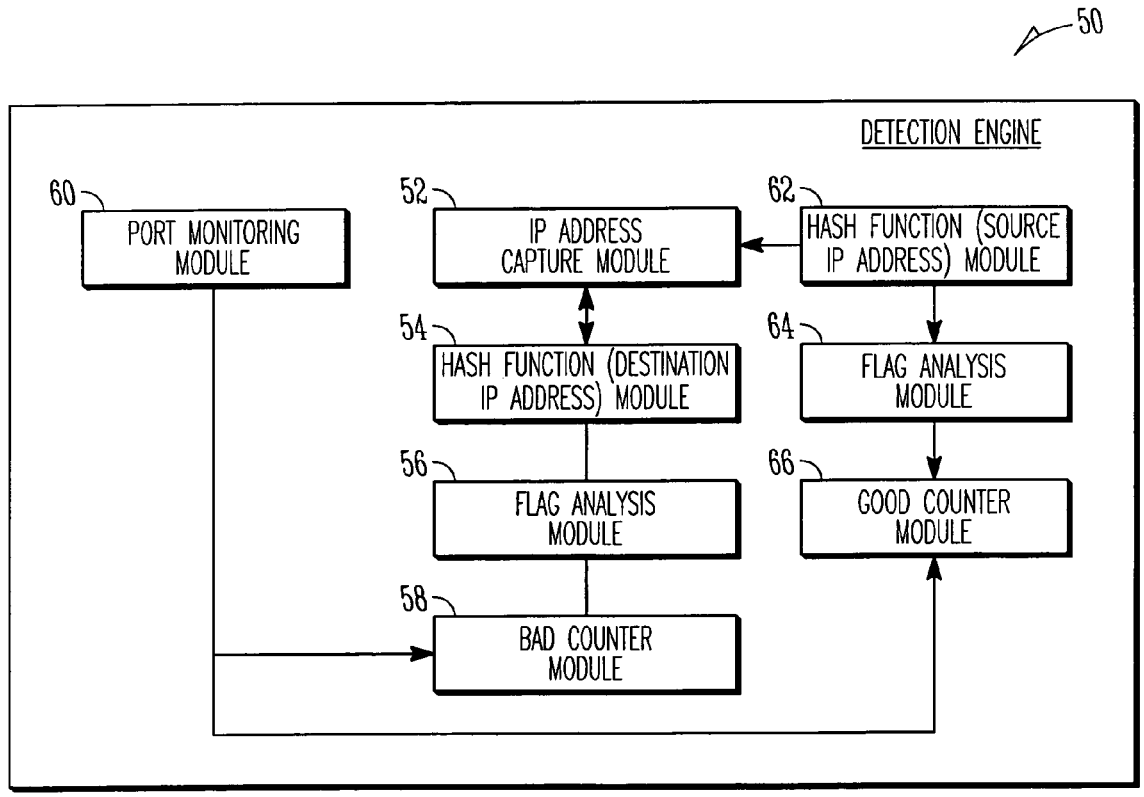
FIG. 4 shows a detection engine, in accordance with an example embodiment, to detect a potentially malicious attack in a network.

FIG. 3 shows apparatus 30, in accordance with an example embodiment, to detect potentially malicious network traffic. For example, the apparatus 30 may be included in a router, a switch, or any other electronic device that processes packets. The apparatus 30 may receive packets 26 from a plurality of different network devices (see FIG. 1 and arrow 32 in FIG. 3) and may implement the methods 70, 80. The packets 26 may be fed into a detection engine 38 which may then detect a potentially malicious attack (e.g., using the methods 70 and 80 described above). When a malicious attack is detected, the detection engine 38 may store packet data, source and destination IP addresses, or the like in the database 40. An optional management interface 42 may be provided to manage the apparatus 30.

FIG. 4 shows a detection engine 50, in accordance with an example embodiment, which may be used in the apparatus of FIG. 3, for example, as the detection engine 38. The detection engine 50 is shown, by way of example, to include an IP address capture module 52 to capture or identify an IP address of each incoming packet 26 (or selected incoming packets). A hash function module 54 generates one or more hashes of a destination IP address of the packet. The detection engine 50 is also shown to include a flag analysis module 56 to analyse the state of one or more flags in the packet and, dependent upon the state of the flags, a bad counter module 58 may increment its count.

The detection engine 50 is also shown to include a hash function module 62 that generates one or more hashes of the source IP address and an example flag analysis module 64 monitors the state of one or more flags in the packet and, dependent upon the state of the flags, a good counter module 66 may increment its count. A port monitoring module 60 is shown to monitor various ports associated with packet traffic and, dependent upon the analysis, counts in the bad counter module 58 and the good counter module 66 are incremented.

Detection of Spreading of Malicious Content

Worms are like infections and try to spread as rapidly as possible. The methodologies described above describe example embodiments to detect suspicious sources, however, a more refined second-order test that may be utilized to identify a large scale infection. Spreading may occur when, for example, a source A (e.g., source device 12 in FIG. 1) exhibits an unusual or potentially malicious behavior, then sends packets to destination B (e.g., destination device 14), upon which B starts exhibiting the potentially malicious behavior, and so on. An analogy in human behavior may be a common cold. If John does not sneeze until he shakes hands with Sally who was detected sneezing the previous day, then there is some basis for the hypothesis that Sally infected John. If, next, Sally shakes hands with Joe and Joe begins to sneeze, and John meets Harry, and Harry begins to sneeze, it becomes increasingly likely that there is an infection spreading. This "viral effect" may be evidence in operation of network devices (e.g., the network devices 12-20 in FIG. 1).

For example, assume that an infected message or packet is sent from source A (e.g., source device 12 in FIG. 1) to destination B (e.g., destination device 14) that is received at time T, and B has never sent a similar infected message or packet before time T. If B sends a message after T, a casualty due to receipt of a message from A may be suspected. For example, if B sends a message to C (e.g., destination device 16) then C is expected to become infected.

In certain embodiments, fundamental behavior may change after receiving a message. For example, a host may be become a server or a relay initiating outbound connections that spread the malicious packets. Such special cases can be incorporated in the methodologies described herein. For example, if there is a known list of servers, this list can be consulted when the detection device receives a SYN to check whether a server is the initiator. If so, this can be considered "bad behavior" for the spreading test that follows.

In an example embodiment the following example constraints may be placed on a spreading detection engine (e.g., the detection engine 50):

Small memory and processing: It may be required to detect spreading with relatively small memory and processing capabilities. In an example embodiment, memory and processing used to perform other test may be leveraged.

Encryption: Although simple scanning tests may be relied upon to detect an encrypted attack, an example embodiment may provide a more sophisticated test for encrypted attacks (e.g., source A started sending an unusually high number of connections/packets, some of the destination devices that received packets from source A may have also started sending an unusually high number of connections/packets).

Understanding False positives: Attempts to save memory and processing capabilities may cause false positives and example embodiments should estimate and restrict the occurrence of false positives.

Forensics: It is desirable to use small memory for attack candidates (because there may be so many of them) but it is also desirable to keep full-state or comprehensive data (e.g., data on all sources that are infected by a worm in an organization) for candidates that are confirmed malicious attacks.

In an embodiment where scalability in message traffic is not an issue, the simplest methodology is for a detection sensor to store for later processing (Source, Destination, time-stamp) pairs when an infected pair is found. In post-processing, it is easy to trace whether a source of an infection at time T received a message from an infected source before T. Unfortunately, this is not very scalable. This is because during an infection hundreds of thousands of sources and destinations may be generated overwhelming the detection device. Instead, an embodiment utilizes the approach described below.

EXAMPLE EMBODIMENT UTILIZING SOURCE AND DESTINATION INFECTED SETS

Figure 8:
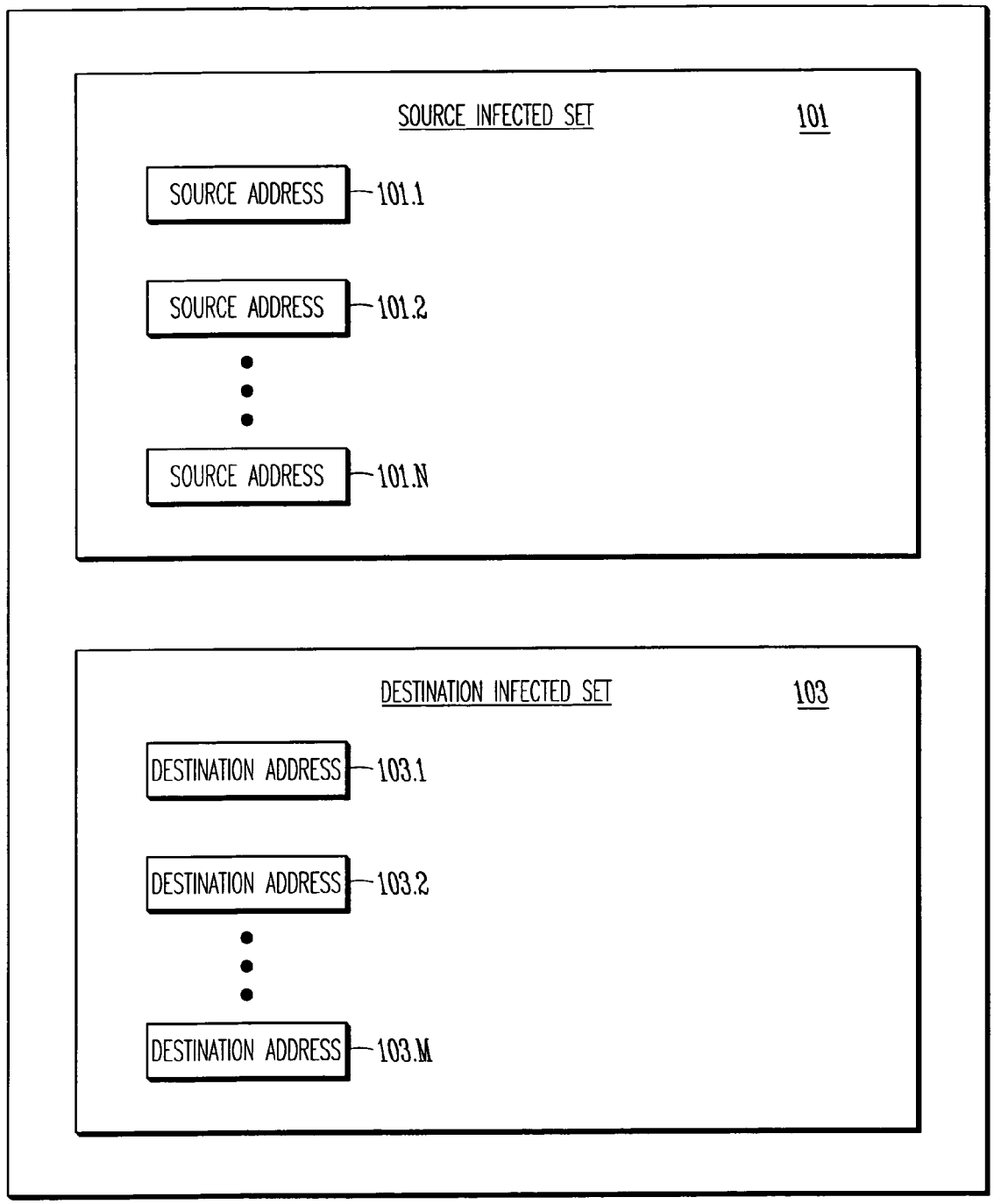
FIG. 8 shows a source infected set and a destination infected set, in accordance with an example embodiment, used to detect suspicious network behavior.

In an example embodiment, a detection engine may utilize sets that include source infected addresses and destination infected addresses. FIG. 8 shows, by way of example, a source infected set 101 including source addresses (e.g., source addresses 101.1-101.n) of infected hosts, and a destination infected set 103 including destination addresses (e.g., destination addresses 103.1-103.m). The detection engine may add addresses to the sets 101 and 103 and check for the presence of an address in the sets 101 and 103.

Figure 7:
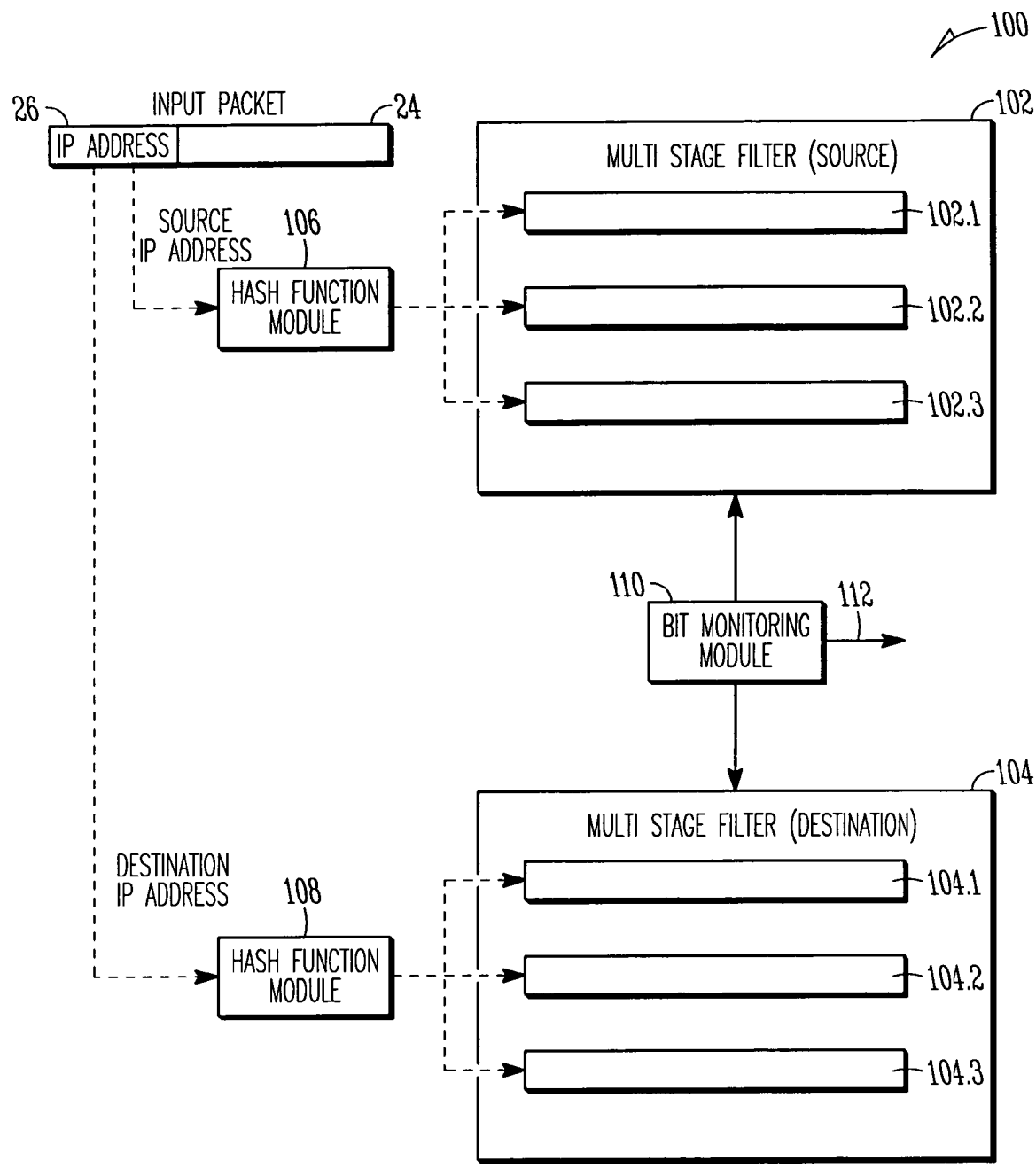
FIG. 7 shows a detection engine, in accordance with an example embodiment, to detect a potentially malicious attack in a network.

FIG. 7 shows an example where a detection engine 100, in accordance with an example embodiment, that utilizes sets implemented in multi stage filters to detect spreading of malicious content in a network. It will however be appreciated that the sets are not limited to multi stage filters but may be Bloom Filters, or the like. The detection engine 100 may include two sets 102 and 104. The set 102 defines a set containing IP source addresses (e.g., source infected set) and the set 104 defines a set of destination IP addresses (e.g., destination infected set).

In use, when a new source is seen to be suspicious (e.g., using the detection engine 50 or the methods 70 and 80 described above), a monitoring module 110 may increment a count for the particular source or destination IP address. When the count for a particular IP address reaches a threshold value, an indication may then be provided (see arrow 112) to indicate that a malicious attack is associated with the particular IP address.

The above description is not specific as to how the two sets (the source infected set 101 and destination infected set 103) will be implemented. The simplest technique is a hashed bitmap. This implementation may use a bitmap of size K, and hashes the source address (or destination address) to a position in the bitmap and sets the corresponding bit. To test whether a source is in the set, the implementation hashes the source and checks whether the corresponding bit is 1.

It will however be appreciated that bit maps, while being efficient, may also cause false positives because a non-infected source can map to the same location (and thus collide) with a bit position of an infected source and vice versa. Nevertheless, a small bit map density may be adequate for bit map tests of spreading of a network attack. Assume that the source bit map gets a new bit set and the destination bit maps have K bits set out of N bits. Then with probability K/N, the monitoring module 110 will increment the count wrongly, even if the new source was not one that was recorded as being attacked. Clearly, this "noise" depends on K. The larger K, the more dominant is the noise.

An example embodiment provides bounded bit density. For example, a bit-map of size K for both the source and destination infected sets may be initialized. When the number of bits set in the destination bit maps 104 exceeds K/16 (bounded bit density) a much bigger bit map (e.g., a 64K bit map for an entire organization) may be utilized.

Thus in an embodiment, the bit map may be at most $\frac{1}{16}^{th}$ full. Thus, if n is the number of source bits set, the expected value of the noise is at most n/16. The standard deviation is sqrt (n)/16. For n>16, if the count is more than n/8, it will be at least 4 standard deviations above the average and may provide a reasonable test for spreading of a network attack. For example, if n=64, then if the counter is more than 8 it may be a good sign that a malicious attack is spreading via the network.

An even more sophisticated way to implement the sets 101 and 103 is to use a Bloom Filter (B. Bloom, Space tradeoff in hash coding with allowable errors. Communications of the ACM 13(7): Pages 422-426) to represent each set. In a Bloom Filter, the sets are still represented by a bitmap. However, each element (such as a source in the source infected set) is represented by multiple (say H) bit positions. To insert say a source, H hash functions are used to hash the source address into H positions in the bitmap. To check whether a source (or destination) is in the bitmap, the source (or destination) is also hashed H times. The source (or destination) is determined to be in the set if and only if all bits in the corresponding bitmap are 1. In accordance with the standard theory of Bloom Filters, this allows smaller collision probabilities and hence the use of smaller density requirements (for example $\frac{1}{4}^{th}$ instead of $\frac{1}{16}^{th}$) than the simple bitmap described earlier.

Source devices may also be classified into more than one type. An example embodiment may keep track of two types of suspicious sources. For example, sources that are more key or more likely than others to be associated with a network attack may be kept in a "Black List" and the count may include a bias when such sources send suspicious packages. For example, an embodiment may keep server information in such the Black List. When packets from a new suspicious source device are received, and the source device is in the Black List, and the packets show that a new source in the source infected set has been discovered, the summary source count for the particular IP Address may be incremental by an additional amount (e.g., a bias B) instead of 1, where B is the bias given to the black listed source over an ordinary source.

Figure 9:
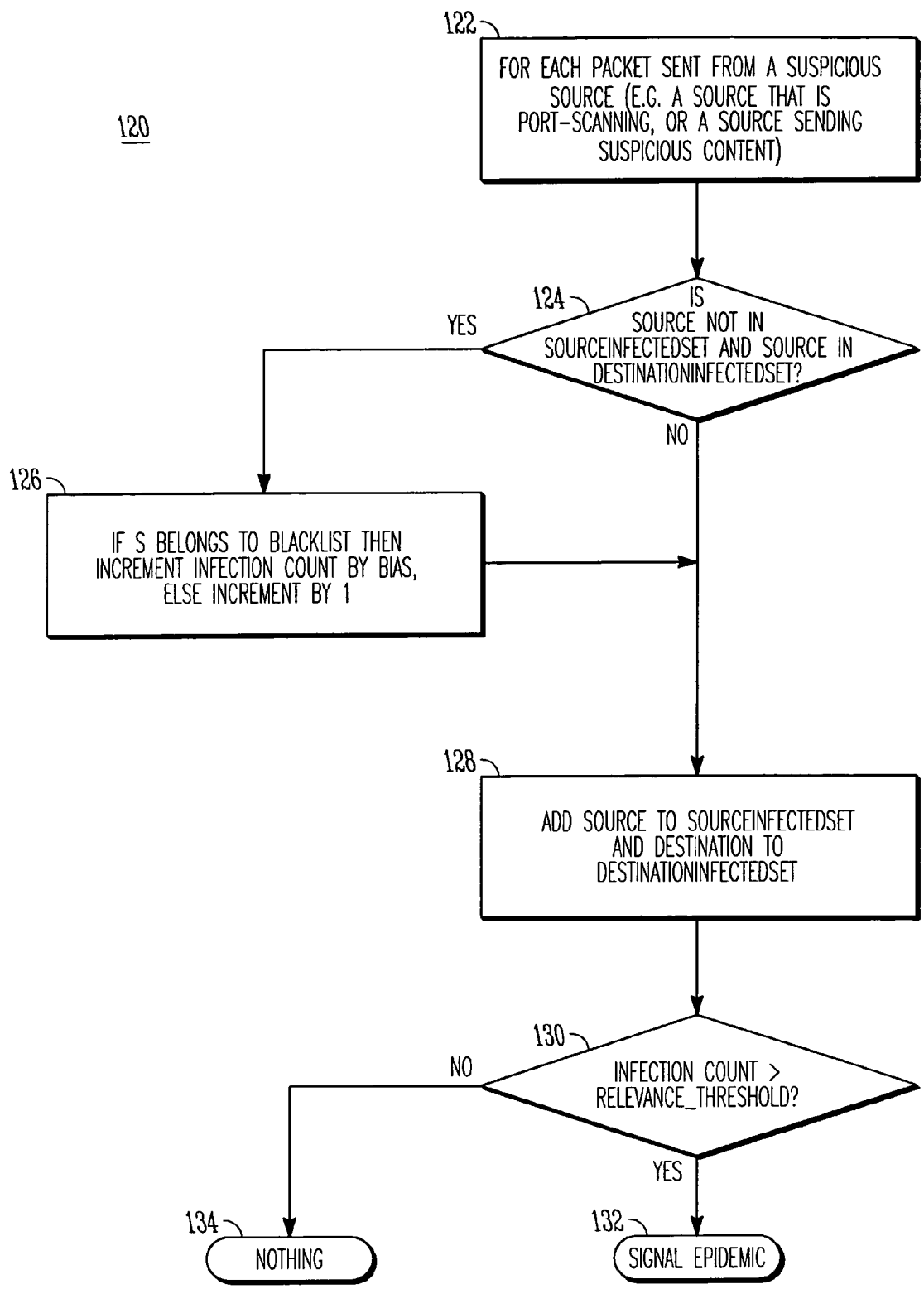
FIG. 9 shows method, in accordance with an example embodiment, to detect suspicious network behavior.

Referring to FIG. 9, reference 120 generally indicates a method, in accordance with an example embodiment, to detect suspicious network behavior. It will be appreciated that the method 120 may operate in conjunction with the detection engine 100 shown in FIG. 7.

The method 120 may be utilized as a spreading test to detect a network attack by correlating destinations that become sources of suspicious behavior. In the method 120 for each suspicious packet (see block 122) from a suspicious source (e.g., a source device 12 in FIG. 1) the source IP address and destination IP address are inserted into the source and destination infected sets (see sets 101 and 103 in FIG. 8). The suspicious source may, for example, be a source that is port scanning or a source that is sending suspicious content.

At decision block 124 a determination is made of the state of the source and destination infected sets. In particular, if the source address is not in the source infected set 101 but the source address is in the destination infected set 103 (this means that the detection device has determined a newly infected source that never exhibited bad behavior before but received a packet earlier from some other badly behaved source), then the method 120 proceeds to block 126. A determination is then made if the source device is provided in a black list of devices and, if so, the count may be incremented by a predetermined bias. If, however, the source device is not provided in the black list, the count may be incremented by 1. After executing the functionality in block 126 the method proceeds to block 128. If, however, the source address is not in the source infected set 101 or the source address is not in the destination infected set 103, then the method 120 proceeds directly to block 128.

In block 128 the source address is added to the source infected set 101 and the destination address is added to the destination infected set 103. Thereafter, as shown at decision block 130, if the infection count exceeds a relevant threshold (e.g., a predetermined threshold), evidence of a network attack (see block 132) had been detected. If not, it may be assumed that there is no network attack as shown at block 134.

Bounded Bit Density with Bloom Filter Attack Set

In the example embodiment described above, the sets 101 and 103 can be implemented with low memory and processing requirements using a Bloom Filter with the only caution that when the number of bits set in the bitmap exceeds a threshold, then the bitmaps must be reallocated to larger bitmap sizes. For example, the both Bloom filters may be reallocated when the number of bits set in either filter exceeds a threshold.

It will be appreciated that the methodologies described herein are not limited to embodiments utilizing scanning behavior and that other methods may be used to identify suspicious behavior. Other examples of suspicious behavior include suspicious content in packets sent from host to host, an infection or network attack resulting in generating high volumes of traffic originating for a specific port (e.g. Witty worm), or the like.

Per-Port Limits for Signature Tracking Resources

It is possible to have a false positive such as epidemic application such as BitTorrent that is downloading the Linux distribution. Since this will have repeated content and lots of sources and destinations, spreading and code, it will be a false positive. Worse, multiple signatures may be extracted and tracked. In this case, the entire signature tracking memory (that tracks source and destination counts) may fill up, leading to not detecting a real worm that has an outbreak at the same time.

In an example embodiment, a defense methodology is provided that limits the number of signature tracking entries assigned to any port or service. It will be appreciated that this number may vary depending on the port. For example, ports like 80 and 25 which are very commonly attacked can be given very high limits while other ports can be given a smaller default limit. In the example above, the BitTorrent port may be limited to the default leaving plenty of space to track worms on other ports while not precluding the ability to detect a BitTorrent worm.

Per-Port Parameters for Detecting Anomalous Content

Analogous to the per-port resource limits, it is possible to be more discriminating for individual services to reduce the false positive rate. For example, for web traffic content is frequently repeated, and for email viruses the content repetition rate is much smaller at the start than for other worms. Thus it is easy to use per-port thresholds on the content prevalence and source and destination count thresholds. Similarly, it is possible to use per-port specific timeouts and other parameters.

Deployment Specific Parameters

Analogous to the per-port resource limits, an embodiment deploys specific thresholds and data structures. For example, in a honey net (with traffic sent to unassigned addresses) it is valid to use very low thresholds, high timeout values, and to do more processing (even if it us unscaleable) because traffic to such honey nets should be much smaller than traffic at major deployment points such as a data center or an ISP link. Similarly, an embodiment varies low thresholds and large timeouts and more processing at small installations such as small offices (the SOHO market) allowing the detection of very slow scanning worms, and rarely repeated content, even possibly Adware and Spyware.

Another example deployment is at special location where each endnode that detects suspicious packets sends packets (after decryption) for content analysis. For example, when a behavior tracking engine at an endhost detects bad content it can send the packet to our content analysis engine which can use very low thresholds, high timeouts, and large processing.

Dynamic Thresholds

In certain embodiments, all the thresholds (e.g., content prevalence and source and destination counts) are static. Such static thresholds may not be accurate across deployments and manual setting can be difficult. Instead, in an embodiment, all thresholds can be set dynamically as follows. First, the average and standard deviation of all counters can be baselined according to the time-of-day for a learning period using some smoothing functions to smooth out rapid variations. Other trend factors can also be computed for example for seasonal trends. Then when the thresholds depart significantly from the baselined average plus several standard deviations after taking into account any trends, then the threshold is considered to have been exceeded. In other words, the dynamic threshold is the smoothed average plus several times the smoothed standard deviation plus a trend factor.

Deterministic Sampling

In an embodiment, a simple technique that adds resiliency to the value sampling approach is deterministic sampling. In addition, to picking offsets to sample based on their hashed value, a set of deterministic offsets can be picked. For example, in an embodiment the first X bytes of a packet may be picked. Alternatively, the first X bytes as well as the last X bytes may be picked or any other deterministic offsets such as these. This may guarantee that some part of the content of every packet is sampled at least once. It may also guarantees that if the whole packet repeats in an infection, then the deterministic portion will also repeat.

Source Port Resiliency

In an example embodiment, source ports are monitored for unusual activity (for example, many more packets sent from a port than to the port) and concatenating such a source port to the content to create a content signature.

Figure 10:
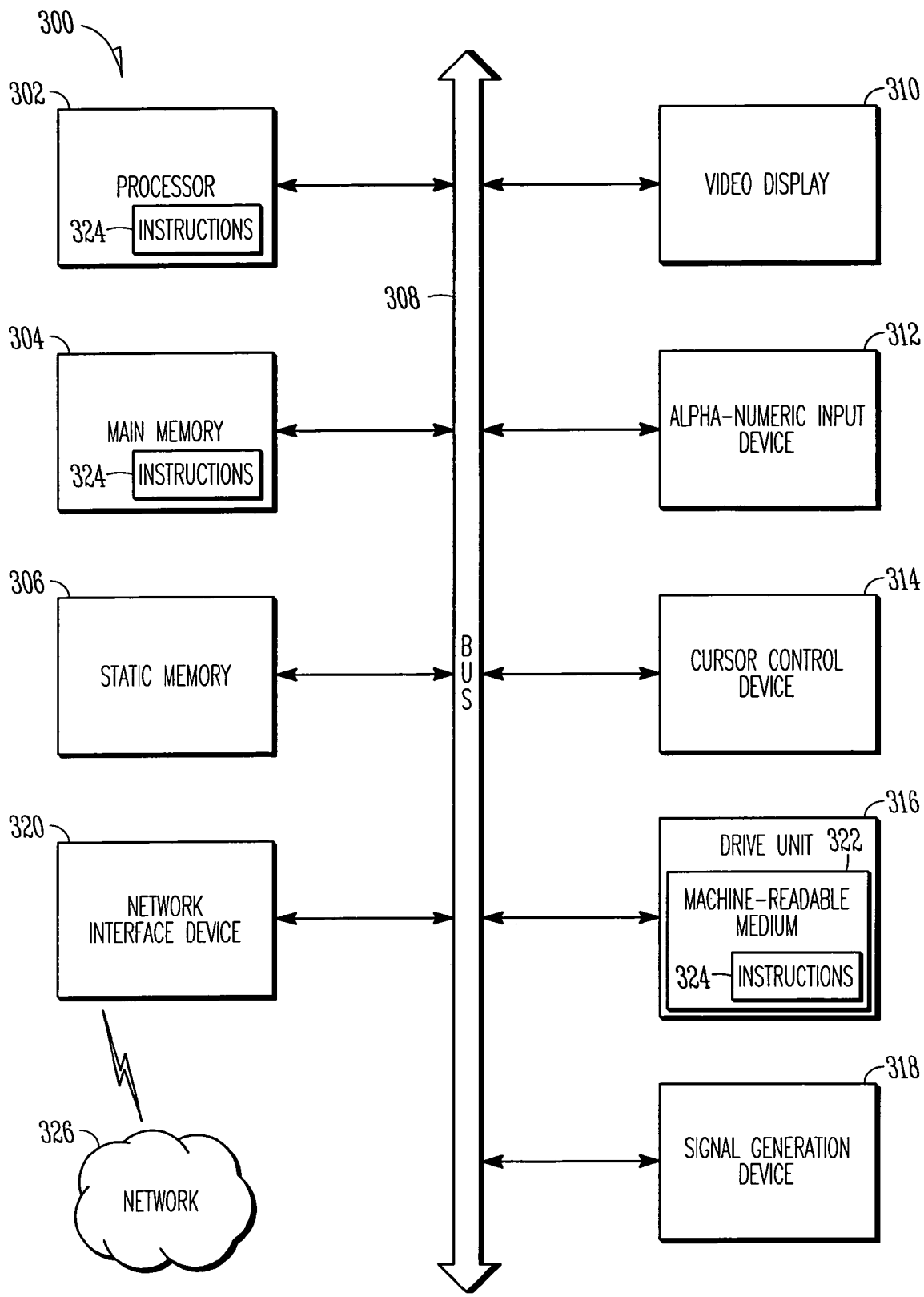
FIG. 10 shows a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 300 within which a set of instructions, for causing the machine to perform any one or more of the methodologies discussed herein, may be executed. It will be appreciated that some of the components of the computer system 300 may be omitted in different embodiments. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. One or more components of the machine may be a personal computer (PC), a tablet PC, a set-top box (STB), a Personal Digital Assistant (PDA), a cellular telephone, a web appliance, a network router, switch or bridge, a port card, a line card, a service card or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method for detecting malicious attacks, the method comprising:
    obtaining routing information from a packet communicated via a network, the routing information including a source address and a destination address;
    maintaining a count of packets associated with a device associated with the routing information;
    identifying the device as a potentially malicious device when the count exceeds a threshold;
    mapping the source address obtained from the packet into a source infected set and mapping the destination address obtained from the packet into a destination infected set, the mapping comprising:
        investigating if the source address is in the source infected set:
        investigating if the source address is also in the destination infected set:
        investigating if the destination address is in the destination infected set:
        incrementing an infection count by at least unity when the source address is not in the source infected set and the source address is in the destination infected set: and
        adding the source address to the source infected set and adding the destination address to the destination infected set;
    checking for the presence of an address in the sets; and
    selectively categorizing a source device associated with the packet as a suspicious device.

2. The method of claim 1, wherein the routing information is a source IP address.

3. The method of claim 2, which comprises monitoring a TCP SYN flag and a TCP ACK flag in each packet.

4. The method of claim 3, which comprises incrementing a good packet count when the TCP SYN flag is set and the TCP ACK flag is not set.

5. The method of claim 2, which comprises incrementing a good packet count if the packet is an ICMP packet of type ECHO.

6. The method of claim 2, which comprises:
    monitoring a TCP RST flag in each packet; and
    incrementing a bad packet count if the TCP RST flag is set.

7. The method of claim 6, which comprises:
    identifying ICMP packets; and
    incrementing a bad packet count for each ICMP packet of type PORT UNREACHABLE or HOST UNREACHABLE.

8. The method of claim 1, which comprises:
    monitoring if a source device corresponding to the source address is in a black list of network devices; and
    incrementing the infection count by a predetermined amount greater than unity when the source address in the black list is not in the source infected set but is in the destination infected set.

9. The method of claim 1, which comprises:
    investigating if the source address is in the source infected set using a Bloom filter;
    investigating if the destination address is in the destination infected set using a second Bloom filter; and
    reallocating both Bloom filters when a number of bits set in either filter exceeds a threshold.

10. The method of claim 1, which comprises:
    investigating if the source address is in the source infected set using a multi stage filter;
    investigating if the destination addresses is in the destination infected set using a second multi stage filter; and
    reallocating both multi stage filters when the number of bits set in either filter exceeds a second threshold.

11. A machine-readable storage medium excluding carrier wave embodying instructions that, when executed by a machine, cause the machine to:
    obtain routing information from a packet communicated via a network, the routing information including a source address and a destination address;
    maintain a count of packets associated with a device associated with the routing information;
    identify the device as a potentially malicious device when the count exceeds a threshold;
    map the source address obtained from the packet into a source infected set and map the destination address obtained from the packet into a destination infected set, the mapping comprising:
        investigating if the address is in the source infected set;
        investigating if the source address is also in the destination infected set;

investigating if the destination address is in the destination infected set;
incrementing an infection count by at least unity when the source address is not in the source infected set and the source address is in the destination infected set; and
adding the source address to the source infected set and adding the destination address to the destination infected set; and
selectively categorizing the source device associated with the packet as a suspicious device.

12. Apparatus to detect malicious attacks, the apparatus comprising a detection engine including:
memory to store information; and
at least one processor operatively coupled to the memory, the at least one processor configured to execute modules comprising:
an IP address capture module to obtain routing information from a packet communicated via a network, the routing information including a source address and a destination address;
at least one counter to maintain a count of packets associated with a device associated with the routing information;
a monitoring module to identify the device as a potentially malicious device when the count exceeds a threshold; and
at least one hash function module to map the source address obtained from the packet into a source infected set and map the destination address obtained from the packet into a destination infected set, the at least one hash function module configured to perform operations comprising:
investigating if the source address is in the source infected set;
investigating if the source address is also in the destination infected set;
investigating if the destination address is in the destination infected set;
incrementing an infection count by at least unity when the source address is not in the source infected set and the source address is in the destination infected set; and
adding the source address to the source infected set and adding the destination address to the destination infected set.

13. The apparatus of claim 12, wherein the routing information is a source IP address.

14. The apparatus of claim 13, further comprising a flag analysis module to monitor a TCP SYN flag and a TCP ACK flag in each packet.

15. The apparatus of claim 14, wherein a good packet count is incremented by a good counter module when the TCP SYN flag is set and the TCP ACK flag is not set.

16. The apparatus of claim 13, wherein a good packet count is incremented by a good counter module if the packet is an ICMP packet of type ECHO.

17. The apparatus of claim 13, further comprising a flag analysis module to monitor a TCP RST flag in each packet, and wherein a bad packet count is incremented by a bad counter module if the TCP RST flag is set.

18. The apparatus of claim 13, wherein ICMP packets are identified and a bad packet count is incremented by a bad counter module for each ICMP packet of type PORT UNREACHABLE or HOST UNREACHABLE.

19. The apparatus of claim 12, wherein the detection engine:
monitors if a source device corresponding to the source address is in a black list of network devices; and
increments the infection count by a predetermined amount greater than unity when the source address in the black list is not in the source infected set but is in the destination infected set.

20. The apparatus of claim 12, wherein the detection engine is further adapted to:
investigate if the source address is in the source infected set using a Bloom filter;
investigate if the destination address is in the destination infected set using a second Bloom filter; and
reallocate both Bloom filters when a number of bits set in either filter exceeds a second threshold.

21. The apparatus of claim 12, wherein the detection engine is further adapted to:
investigate if the source address is in the source infected set using a multi stage filter;
investigate if the destination address is in the destination infected set using a second multi stage filter; and
reallocate the multi stage filters when a number of bits set in either filter exceeds a second threshold.

22. Apparatus to detect malicious attacks, the apparatus comprising:
means for obtaining routing information from a packet communicated via a network, wherein the routing information includes a source address and a destination address;
means for maintaining a count of packets associated with a device associated with the routing information;
means for identifying the device as a potentially malicious device when the count exceeds a threshold;
means for mapping the source address obtained from the packet into a source infected set and mapping the destination address obtained from the packet into a destination infected set, the means for mapping configured to perform operations comprising:
investigating if the source address is in the source infected set;
investigating if the source address is also in the destination infected set;
investigating if the destination address is in the destination infected set;
incrementing an infection count by at least unity when the source address is not in the source infected set and the source address is in the destination infected set; and
adding the source address to the source infected set and adding the destination address to the destination infected set; and
means for selectively categorizing a source device associated with the packet as a suspicious device.

* * * * *

UNITED STATES PATENT AND TRADEMARK OFFICE
CERTIFICATE OF CORRECTION

| | | |
|---|---|---|
| PATENT NO. | : 7,936,682 B2 | Page 1 of 1 |
| APPLICATION NO. | : 11/271133 | |
| DATED | : May 3, 2011 | |
| INVENTOR(S) | : Sumeet Singh et al. | |

It is certified that error appears in the above-identified patent and that said Letters Patent is hereby corrected as shown below:

In column 11, line 63, in Claim 1, delete "set:" and insert -- set; --, therefor.

In column 11, line 65, in Claim 1, delete "set:" and insert -- set; --, therefor.

In column 11, line 67, in Claim 1, delete "set:" and insert -- set; --, therefor.

In column 12, line 3, in Claim 1, delete "set:" and insert -- set; --, therefor.

In column 12, line 43, in Claim 9, after "a" insert -- second --.

In column 12, line 49, in Claim 10, delete "the" and insert -- a --, therefor.

In column 13, line 10, in Claim 11, delete "categorizing the" and insert -- categorize a --, therefor.

Signed and Sealed this
Sixteenth Day of August, 2011

David J. Kappos
*Director of the United States Patent and Trademark Office*